United States Patent [19]

Adriaans et al.

[11] Patent Number: 4,496,698
[45] Date of Patent: Jan. 29, 1985

[54] PROCESS FOR PRODUCING POLYETHYLENE HAVING CONSTANT PHYSICAL AND CHEMICAL PROPERTIES

[75] Inventors: Jan L. J. Adriaans, Hulst; Pieter G. Dees, Terneuzen, both of Netherlands

[73] Assignee: The Dow Chemical Company, Midland, Mich.

[21] Appl. No.: 401,769

[22] Filed: Jul. 26, 1982

[51] Int. Cl.³ .................................... C08F 10/02
[52] U.S. Cl. ...................... 526/64; 526/73; 526/74; 526/352
[58] Field of Search ........................ 526/64, 352

[56] References Cited

U.S. PATENT DOCUMENTS 4,282,339 8/1981 Donaldson et al. .............. 526/64

Primary Examiner—Harry Wong, Jr.
Attorney, Agent, or Firm—B. M. Kanuch; T. J. Mielke

[57] ABSTRACT

A process for producing polymers or copolymers of ethylene, in which ethylene, optionally together with one or more copolymerizable compounds, is polymerized at a pressure above 50,000 kPa and a temperature of between 100° and 400° C. in the presence of an initiator, using an autoclave reactor and a tubular reactor connected in series with said autoclave reactor. The monomeric mixture in the presence of the initiator is passed first into a stirred autoclave, in which it is partially polymerized. Thereafter the reaction mixture from said autoclave, is passed through a heat exchanger, cooled to a pre-determined value, and then subsequently passed to a non-cooled tubular reactor, in which the further polymerization is carried out under adiabatic conditions.

3 Claims, 1 Drawing Figure

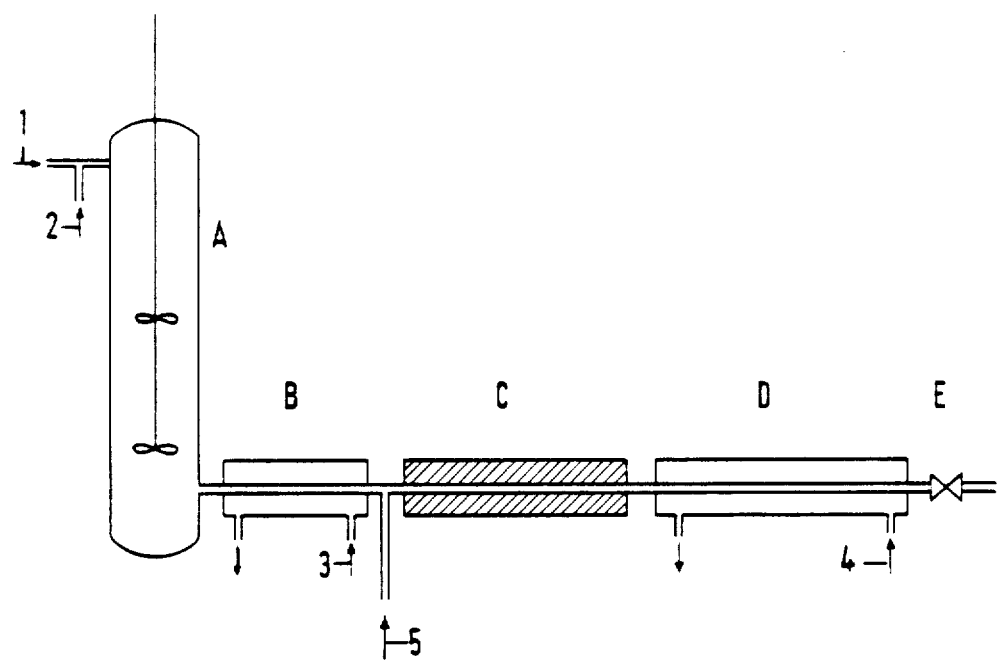

PROCESS FOR PRODUCING POLYETHYLENE HAVING CONSTANT PHYSICAL AND CHEMICAL PROPERTIES

This invention relates to a process for producing polyethylene having constant physical and chemical properties.

It is known to polymerize ethylene under high pressure in a stirred autoclave reactor, in which the ratio between length and diameter ranges from 5 to 20, and to which monomer and catalyst are supplied at one or more places, and which may be divided into a plurality of reaction zones. The conversion, the percentage of ethylene converted into polyethylene, which can be calculated from the difference in temperature between the reaction mixture and the supplied ethylene monomer, i.e., from the adiabatic temperature increase of the reaction mixture, is maximally 20 percent and generally 15 percent. This maximum conversion is limited because the quantity of heat from the highly exothermic polymerization reaction that is dissipated through the wall is negligible, and the temperature must not be too high, in view of the possible explosive decomposition of the reaction mixture from hot spots which may occur. The resulting reaction product, whose physical and chemical properties are fairly constant, has a high degree of branching. Especially its so-called long-chain branching is high.

On the other hand it is known to polymerize ethylene in tubular, externally cooled reactors, in which the ratio between length and diameter may vary from 400 to 40,000. The monomer, which is generally pre-heated, and the catalyst are supplied at one or more places. The conversion, which can be calculated from the temperature of the reaction mixture, the temperature of the ethylene supplied, and the heat discharged by the cooling medium, is maximally 35 percent, and generally 20 percent. The maximum conversion is higher than in an autoclave reactor, because reaction heat is continuously carried off and the average temperature of the reaction mixture may be higher than that of the reaction mixture in an autoclave.

The reaction product has a much lower degree of long-chain branching, and hence a different range of uses from that produced in an autoclave reactor (cf Hydrocarbon Processing, November, 1978, pp. 151 ff). The physical and chemical properties of the polymerization product are not constant because of the variable polymerization conditions.

For a number of uses, for example, the application of coverings by extrusion coating, it is desirable to prepare a polyethylene whose physical and chemical properties form a combination of those respectively obtained using an autoclave reactor and a tubular reactor.

In Canadian Pat. No. 867,829, there is described a process for producing polymers or copolymers of ethylene, in which ethylene, in the presence or absence of one or more compounds copolymerizable with it, is first passed into a stirred autoclave at a pressure above 50,000 kPa and a temperature of between 100° and 400° C., in the presence of an initiator. The ethylene is partially polymerized in the autoclave. Thereafter the resulting reaction mixture is passed through an externally cooled tubular reactor, in which the polymerization is continued.

Although it is stated in the patent specification that owing to the combination of an autoclave and a tubular reactor ethylene polymers can be produced which have properties quite different from those of products produced in either an autoclave or a tubular reactor, the object of the invention described is to obtain a higher conversion. For this purpose the polymerization heat released in the autoclave is used to bring the monomer supplied to the tubular reactor at the reaction temperature, so that the usual pre-heating section of this reactor can be omitted in full or in part. In the tubular reactor, heat is removed from the system by external cooling, so that the permissible reaction temperature, and hence the conversion that can be achieved, are maximal.

It is also known that in the polymerization of ethylene using series-connected reactors, intermediate cooling of the monomer/polymer mixture coming from the first reactor is possible. Thus, U.S. Pat. No. 4,229,416 describes a process in which ethylene is converted under high pressure in a first reactor the resulting monomer/polyethylene mixture is cooled in an intermediate cooler, whereafter the pressure of the mixture is decreased, and the cooled mixture is further polymerized in a second reactor under a reduced pressure. The object of the intermediate cooling, in combination with the decrease in pressure, in this process is to achieve higher conversion and prevent phase separation in the monomer/polymer mixture. The combination of intermediate cooling with an adiabatic second polymerization reaction to produce constant product properties is not described or suggested.

The physical and chemical properties which are of particular importance for the uses of polyethylene referred to hereinbefore, are the "neck-in" (i.e., one-half of the difference between the width of the polymer film at the die opening and the width of the polymer film at the nip roll), the melt index, the poly-dispersity, i.e., the molecular weight distribution, and the maximum linear velocity during extrusion. It has been found that for the constantness of these properties, the constantness of the process variables applying during the polymerization of ethylene, such as reaction temperature, the temperature profile across the reactors employed, uniformity of conversion (determined by the constantness of the quantity of initiator added per unit of time) as well as the conversion, plays a major role.

In prior processes, in which series-connected autoclave and cooled tubular reactors are used, it is not possible to keep these process variables constant, so that the physical and chemical properties of the polyethylene produced using these processes are not constant in a fully satisfactory degree.

For example, in the polymerization of ethylene, inhomogeneities occur in the reaction mixture consisting of unreacted ethylene and polyethylene. Although in principle the mixture forms one phase under the pressures prevailing during the polymerization, some phase separation may occur especially when a relatively low reactor pressure is employed. In a 'stirred' autoclave reactor these inhomogeneities immediately disappear again, but in a tubular reactor, in which the current velocity of the reaction mixture approaches zero at the reactor wall, they have a much more lasting character. This phenomenon has in the first instance the same effect as a real deposition on the reactor wall, namely, of decreasing heat transfer, owing to which the temperature profile across the reactor is altered, and the physical and chemical properties of the resulting product are changed.

The technical term used for this phenomenon is "fouling" but unlike actual fouling or accretion on the reactor wall, it is not a phenomenon monotonously increasing in time, but one which varies in a rather unpredictable manner. For the very reason that in a cooled tubular reactor polymerization is carried out at as high a reaction temperature as possible and the fouling effect referred to can give rise to peaks in the temperature, which may lead to explosive decomposition of the reaction mixture, it is necessary to control the polymerization reactor, for example by controlling the stream of initiator. This, however, leads in turn to nonuniform conversion and hence to variations in the physical properties of the polyethylene produced.

It is also known to eliminate the disadvantages inherent in "fouling" by counteracting such "fouling" itself, for example, by subjecting the contents of the reactor periodically to pressure surges or by increasing the linear velocity of the reaction mixture. Apart from the fact that a sudden pressure drop of, e.g., 80,000 kPa in a reactor in which polymerization is carried out at a conventional pressure of e.g., 120,000 kPa involves the risk of increased phase separation between polymer and unconverted ethylene, these pressure surges lead to a nonuniform course of reaction, and hence to variations in product properties. An increase in linear velocity of the reaction mixture leads to an increased pressure drop across the reactor. By reason of the above problem of phase separation, the lowest permissible pressure in the reactor must not be less than a given minimum value. This means that a higher initial pressure must be used. This is very unattractive from an economic point of view, and in additon it is not possible to prepare certain polymeric products at such an increased pressure.

The underlying problem of the present invention was to prepare a polyethylene whose physical and chemical properties form a combination of those respectively obtained using an autoclave reactor and a tubular reactor, and whose properties are more consistent than can be achieved using a series-connected autoclave and cooled tubular reactor. According to the present invention, there is provided a process for preparing polyethylene having constant physical and chemical properties, and which comprises first passing ethylene, optionally together with one or more copolymerizable compounds into a stirred autoclave at a pressure above 50,000 kPa and a temperature of between 100° and 400° C. in the presence of an initiator, in which it is partially polymerized, discharging the reaction mixture from said autoclave, passing said reaction mixture through a heat exchanger, in which it is cooled to a pre-determined value, and subsequently passing the reaction mixture into a non-cooled tubular reactor, and continuing the polymerization therein under adiabatic conditions.

The accompanying drawing shows a diagrammatic representation of an apparatus for carrying out the process according to the invention using an autoclave reactor A, an intermediate cooler B, a tubular reactor C, and a product cooler D.

The process according to the invention offers a number of important advantages. As the temperature of the reaction mixture at the input of the tubular reactor is fixed and the polymerization in the reactor is carried out adiabatically, any "fouling" which occurs does not affect the maximum temperature which the reaction mixture can reach. This means that a desired maximum temperature of the reaction mixture can be selected, and can be controlled by adjusting the temperatures of the streams supplied to the reactor at a predetermined value, and to adjust the initiator current at a pre-determined value in relation to this selected temperature.

This results, at a constant conversion, in a constant temperature profile across the reactor. As, in addition, the "fouling" which occurs does not affect the physical and chemical properties of the polyethylene, these properties are much more constant than those of polyethylene produced by a prior process.

As, in the process according to the invention, the temperature of the reaction mixture supplied to the tubular reactor can be freely selected, the maximum conversion is also adjustable within certain limits, this being affected to a much smaller extent by the hazard of excessive peak temperatures which occur in the reactor. Consequently, at a selected maximum temperature in the reactor, a higher conversion can be obtained when the temperature of the mixture supplied to the reactor is selected at a lower value. This conversion is then ultimately determined by the activity of the initiator, by virtue of which the efficiency of the polymerization process is improved in this respect too.

In the process according to the invention, the mixture discharged from the autoclave reactor is preferably cooled to a temperature of between 220° and 250° C. The heat exchanger is so dimensioned that under all conditions, i.e., irrespective of the "fouling" which occurs in it, a desired temperature of the effluent mixture from the heat exchanger can be adjusted.

Preferably, in the process according to the invention, the pressure during the second polymerization stage is equal to that during the first polymerization stage.

One embodiment of the process according to the present invention will now be described with reference to the accompanying drawing, which shows a diagrammatic representation of apparatus for carrying out the process according to the invention.

Referring to the drawing, ethylene, which may contain a comonomer, is supplied under pressure through a line 1, to an autoclave reactor A, to which a stream of initiator is supplied through a line 2. In autoclave reactor A, a portion of the ethylene present is converted, with the initiator being consumed in full, or very nearly so. Subsequently, the resulting monomer/polymer mixture is passed through an intermediate cooler B. Cooler B comprises one or more tubes provided with jackets through which a cooling medium is circulated, preferably water, which is supplied at 3. When water is used as the cooling medium, the heat withdrawn from the reaction mixture may be recovered in the form of steam. To the mixture issuing from the cooler, fresh initiator is supplied through line 5, and the mixture then flows through tubular reactor C, in which again a portion of the ethylene present is polymerized. Tubular reactor C is surrounded by a heat-insulating jacket.

The polymer discharged from reactor C is subsequently cooled in a product cooler D, and finally pressure is decreased by means of a control valve E, where unconverted ethylene is separated and can be recycled. Product cooler D is suitably of the same type as intermediate cooler B.

It is clear that a plurality of units of autoclave reactor and/or tubular reactor can be connected in series.

The invention is illustrated in and by the following examples.

In the process according to the examples, the heat transfer coefficient (kgcal/m$^2$/hour/°C.) was calculated in the conventional manner from the heat balance across the cooler/reactor, relative to the interior surface area. The melt index was determined according to ASTM D 1238, and polydispersity was determined by means of gel permeation chromatography. In all examples, a full scale production unit was used. Ethylene was supplied to the autoclave, and the pressure in the autoclave was equal to that in the tubular reactor. The conversion was set at a low value to produce the best possible product, and was calculated from the heat balance across the reactor. In all experiments, drawdown (linear velocity) and neck-in were determined by means of a laboratory test apparatus line (Erwepa) with a gap width of 60 cm.

COMPARATIVE EXAMPLE I

In this example, the combination of an autoclave and an externally cooled tubular reactor is used.
Pressure in the autoclave: 144,000 kPa.
Conversion in the autoclave reactor: 14.1 percent
Cooling water temperature in the reactor: 160° C.
Successive measurements were made with intervals of one hour, the results of which are listed in the following table.

TABLE 1

| Time | Heat Transfer Coefficient In Reactor | Temperature In The Tubular Reactor | | Conversion (%) |
|---|---|---|---|---|
| | | Inlet | Peak | |
| 1 | 300 | 242 | 275 | 3.1 |
| 2 | 200 | 243 | 275 | 2.8 |
| 3 | 120 | 242 | 275 | 2.7 |

The heat transfer coefficients indicate the varying degree of fouling which takes place at different times in the reactor. As a result of the varying fouling, the quantity of heat removed from the reactor varies, and so does, accordingly, the average temperature of the reaction mixture.

As, on account of the hazard of explosion, the peak temperature must not exceed a given value, it is kept properly constant by controlling the quantity of initiator. This, however, introduces significant variations in the conversion in the tubular reactor, and also in the average temperature at which conversion is affected, owing to which the product properties exhibit undesirable variations.

Analysis of the polymer corresponding with the above points of time shows that the product properties exhibit undesirable variations. The results are listed in the following table.

TABLE 2

| Time | Melt Index | Polydispersity | Maximum Drawdown (at 310° C.) (linear Velocity, m/min) | Neck-in cm |
|---|---|---|---|---|
| 1 | 8.5 | 11.3 | 190 | 2.4 |
| 2 | 7.0 | 10.7 | 220 | 2.5 |
| 3 | 6.6 | 9.8 | 290 | 2.8 |

The type of polyethylene prepared by the process according to the present invention in particular finds application as a coating for cardboard, applied by means of an extrusion coating process.

An important feature in the processing of this polymer is that it permits sufficient "drawdown" (linear velocity) and exhibits a minimum amount of neck-in. This type of polyethylene is rated as having a very satisfactory processability in practice if, in a laboratory test line, at a processing temperature of 310° C., a permissible drawdown is measured of no less than 200 m/min. with the maximum neck-in being 2.5 cm. Important polymer properties which play a role in this respect are the melt index and polydispersity which, according to experience, are optimal for this type of polyethylene at respective values of approximately 7.0 and 10.5. As shown in Table 2, the sample taken at time 2 is the only one which satisfies these requirements. Because of varying conversion level and changing polymerization conditions, it is impossible to maintain the required polymer properties, and coating performance deteriorates.

COMPARATIVE EXAMPLE II

In this example, the same reactor combination is used as in Comparative Example I, but now an intermediate cooler was used between the autoclave reactor and the cooled tubular reactor.
Reactor pressures: 147,000 kPa
Autoclave conversion: 13.1 percent
Cooling water temperature in intermediate cooler 154° C.; in tubular reactor 157° C.
Interval between measurements: 1 hour.

TABLE 3

| Time | Heat Transfer Coefficient | | Reactor Temperature | | Conversion % | Melt Index | Polydispersity |
|---|---|---|---|---|---|---|---|
| | Intermediate Cooler | Reactor | Inlet | Peak | | | |
| 1 | 650 | 170 | 234 | 259 | 2.2 | 3.3 | 7.5 |
| 2 | 580 | 300 | 236 | 259 | 2.6 | 5.1 | 8.5 |
| 3 | 470 | 240 | 238 | 259 | 2.4 | 4.0 | 8.2 |
| 4 | 510 | 210 | 237 | 259 | 2.3 | 3.5 | 7.4 |

The type of polyethylene produced was again processed by means of extrusion coating but, owing to a higher density than that in Example 1, as a result of which a lower gas permeability was realized, this was processed for other end products.

Here again it is important that the product satisfies as constantly as possible processing criteria which, as determined by experience, are best satisfied in the melt index and dispersity are approximately 4.0 and 8.0, respectively. Here again it turns out that owing to variation in conversion and polymerization conditions, resulting from a varying degree of fouling in the tubular reactor and in the intermediate cooler, it is impossible to maintain these values in a satisfactory manner.

In the following experiment, the cooled tubular reactor as used in the processes described in Comparative Examples I and II, was replaced by a tubular reactor provided with an insulating jacket and operating adiabatically. The selected temperature of the reaction mixture at the inlet of the tubular reactor was automatically controlled by adjusting the water temperature in the jacket of the intermediate cooler.

The reactor was now capable of being operated under controlled, constant conditions by controlling the inlet temperature and the peak temperature, by virtue of which a highly constant conversion and highly constant product properties were obtained, in spite of any variations in degree of fouling of the reactor which occurred.

EXAMPLE III

Combination of Polymerization in an Autoclave Reactor and Adiabatic Polymerization in a Tubular Reactor Pressure: 145,000 kPa.
Conversion in the autoclave: 14.7%
Interval between measurements: 1 hour.

TABLE 4

| Time | Heat Transfer Coefficient, Intermediate Cooler | Reactor Inlet | Temperature Peak | Conversion % | Melt Index | Polydispersity |
|---|---|---|---|---|---|---|
| 1 | 300 | 241 | 278 | 2.7 | 7.0 | 10.4 |
| 2 | 270 | 241 | 278 | 2.7 | 7.3 | 10.8 |
| 3 | 190 | 241 | 278 | 2.7 | 7.2 | 10.6 |
| 4 | 330 | 241 | 278 | 2.7 | 6.9 | 10.3 |

The type of polyethylene produced is suitable for the same purposes as that produced in Comparative Example I. When processed in the laboratory test line, the above four samples all satisfy the set criteria of a minimum drawdown of 200 m/min and a maximum neck-in of 2.5 cm. The conversion in the tubular reactor is in the case slightly less than the average value according to Comparative Example I, but this drawback pales into insignificance beside the improved uniformity in critical product properties.

EXAMPLE IV

In this example the polymerization reaction was conducted in the same manner as in Example II, but using the equipment of Example III. The results, obtained in a manner similar to Example III, are listed in the following table.

TABLE 5

| Time | Heat Transfer Coefficient, Intermediate Cooler | Reactor Inlet | Temperature Peak | Conversion % | Melt Index | Polydispersity |
|---|---|---|---|---|---|---|
| 1 | 470 | 234 | 261 | 2.0 | 4.1 | 8.1 |
| 2 | 420 | 234 | 261 | 2.0 | 4.2 | 7.9 |
| 3 | 340 | 234 | 261 | 2.0 | 3.9 | 8.2 |
| 4 | 510 | 234 | 261 | 2.0 | 4.1 | 8.2 |

Here again it turns out that when conversion is kept highly constant, and also a constant temperature is maintained in the reactor, highly uniform critical product properties are obtained.

What is claimed is:

1. A process for producing polymers or copolymers of ethylene in which ethylene, optionally together with one or more copolymerizable, unsaturated compounds, is polymerized at a total system pressure above 50,000 kPa and a temperature of between 100° and 400° C. in the presence of an initiator, and using a stirred autoclave reactor and a non-cooled tubular reactor connected in series with said autoclave reactor, characterized by passing a monomeric mixture in the presence of the initiator first into said autoclave in which it is partially polymerized, and thereafter discharging the reaction mixture from said autoclave, and passing it through a heat exchanger in which it is cooled to a predetermined value ranging between 220° and 250° C., and subsequently passing the reaction mixture to said non-cooled tubular reactor, in which the further polymerization is carried out under adiabatic conditions.

2. A process as claimed in claim 1, characterized in that the mixture discharged from the autoclave is cooled so that its temperature at the inlet of the tubular reactor ranges between 220° and 250° C.

3. A process as claimed in claim 1, characterized in that the maximum temperature in the tubular reactor is adjusted to a value of between 250° and 290° C.

* * * * *